(12) United States Patent
Omatsu et al.

(10) Patent No.: US 6,406,204 B1
(45) Date of Patent: Jun. 18, 2002

(54) OILY INK FOR WRITING INSTRUMENT

(75) Inventors: Takeshi Omatsu, Kyotanabe; Hiroshi Inoue, Higashiosaka, both of (JP)

(73) Assignee: Sakura Color Products Corporation, Osaka (JP)

( * ) Notice: Subject to any disclaimer, the term of this patent is extended or adjusted under 35 U.S.C. 154(b) by 0 days.

(21) Appl. No.: 09/665,984

(22) Filed: Sep. 20, 2000

(30) Foreign Application Priority Data

Sep. 20, 1999 (JP) .......................................... 11-266076
Jul. 11, 2000 (JP) ...................................... 2000-209961

(51) Int. Cl.$^7$ ................................................. B43K 7/08
(52) U.S. Cl. ...................... 401/142; 401/141; 523/161; 106/31.6
(58) Field of Search ................................ 401/141, 142; 523/161, 160; 106/31.6, 31.64

(56) References Cited

U.S. PATENT DOCUMENTS

| | | | | |
|---|---|---|---|---|
| 3,000,354 A | * | 9/1961 | Germann | 401/141 |
| 4,654,081 A | * | 3/1987 | Dalzell | 106/23 |
| 4,973,180 A | * | 11/1990 | Hori | 401/141 |
| 5,199,976 A | * | 4/1993 | Yau et al. | 106/19 A |
| 5,306,755 A | * | 4/1994 | Yau et al. | 524/296 |
| 5,348,989 A | * | 9/1994 | Shiraishi | 523/161 |
| 5,500,455 A | * | 3/1996 | Terakawa | 523/161 |
| 5,964,931 A | * | 10/1999 | Korper | 106/31.93 |
| 6,012,864 A | * | 1/2000 | Asami | 401/142 |
| 6,200,053 B1 | * | 3/2001 | Asami et al. | 401/142 |

\* cited by examiner

Primary Examiner—Gregory L. Huson
Assistant Examiner—Huyen Le
(74) Attorney, Agent, or Firm—Howard C. Miskin; Gloria Tsui-Yip; David M. McConoughey

(57) ABSTRACT

An oily ink for writing instruments comprising
 e. colorant,
 f. resin,
 g. an organic solvent and
 h. a gelling agent,
wherein the said gelling agent comprises a soluble gelling agent with the solubility of from about 0.1 to about 20% by weight at a temperature of 20° C. to the said organic solvent, and the viscosity of the ink is not less than 700 mPa·s when the rate of shear is 0.1 (1/s) and not greater than 500 mPa·s when the rate of shear is 100 (1/s).

23 Claims, 2 Drawing Sheets

OILY INK FOR WRITING INSTRUMENT

BACKGROUND OF THE INVENTION

1. Field of the Invention

The present invention relates to an oily ink, particularly an oily ink designed for writing instruments. The present invention relates to a gel-type oily ink which can be suitably used for correction tools including correction pens, oil-type ball-point pens, paint markers and the like.

2. Description of the Prior Art

Heretofore, as an oily ink for writing instruments, paint markers using aluminum powder pigments, correction pens containing titanium dioxide, and the like have been proposed. In addition, with regard to the oily ink, there are various types of constructions for the correction pens, including pen-types, bottle-types with brush coatings, and the like. These types share the common characteristics of having a stirrer made of a metallic ball built in the container in order to redisperse the colorants by stirring the ink itself. That is, in the conventional paint markers or ball-point pens, when they are left in a settled state, colorants including aluminum powder pigments or titanium dioxide settle in the ink within the container and the functions as paint markers or ball-point pens cannot be fully realized. Therefore, it has been necessary for the users to redisperse the colorants that settle and separate in the container, in order to restore the initial disperse state.

Japanese Unexamined Patent Publication No. 6-264012 proposes a correction fluid compounding montmorillonite— type clay mineral in order to prevent the sedimentation of the colorants as an opacifying agent and maintain the redispersibility of the system. Japanese Unexamined Patent Publication No. 7-173417 proposes a correction fluid compounding a fluorine metallic mica.

However, in the case of such conventional oily ink compositions, sedimentation layers are sometimes formed at the bottom of the ink when left in a settled state for a long period of time although the compositions prevent the colorants from settling as much as they can. Therefore there is little difference from the conventional oily ink in that redispersion has to be considered. Moreover, and in particular, when the clay mineral or fluorine metallic mica is compounded beyond a certain level for thickening the viscosity, the ink compositions have become gel-type, thereby making it impossible to obtain smooth coated films when coating. Regarding this point, the same thing can be said about an oily ink composition used for oil-type ball-point pens or paint markers as well as correction tools including correction pens and the like, and the provision of such an oily ink as can prevent sedimentation of the colorants while maintaining writing performance is desired in that field, too.

Further, in conventional oil-type ball-point pens, particularly in ball-point pens using a white-colored oily ink, like general ball-point pens using a black-colored ink, solvents with high boiling point are used, thereby causing the problem of not drying when writing with such an ink on a non-absorbent surface although when writing on an absorbent surface like that of paper and the like, drying can be seen only apparently. Moreover, the fact is that the fluidity is very bad and has no practicality in coating on a surface, especially thickly on a surface.

SUMMARY OF THE INVENTION

It is, therefore, desirable to provide an oily ink composition that is not inclined to sedimentation and that dose not necessitate redispersion of its components. This is desirably provided by an oily ink for writing instruments comprising a. a colorant,
b. a resin,
c. an organic solvent and
d. a gelling agent, wherein the said gelling agent comprises a soluble gelling agent with a solubility of from about 0.1 to about 20% by weight at the temperature of 20° C. to the said organic solvent, and the viscosity of the ink is not less than 700 mPa·s when the rate of shear is 0.1(1/s) and not greater than 500 mPa·s when the rate of shear is 100(1/s)

DESCRIPTION OF THE PREFERRED EMBODIMENTS

Figure 1:
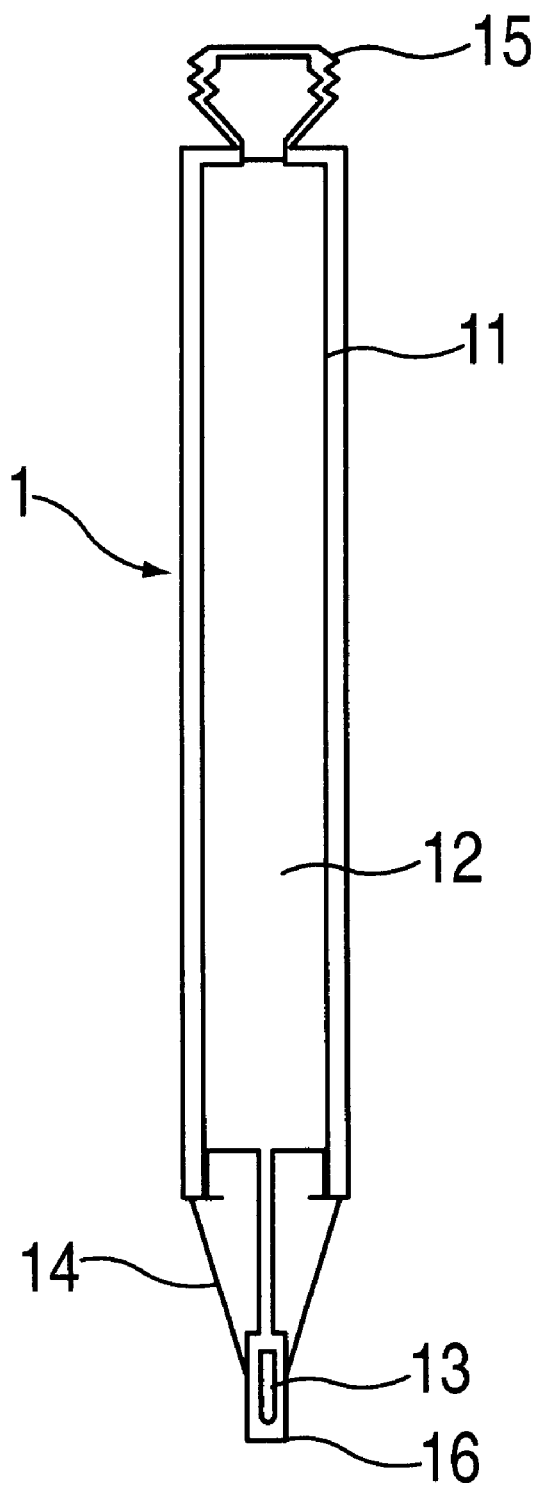
FIG. 1 is a schematic sectional view showing one embodiment of a correction pen in accordance with the present invention.

As a result of intensive studies for achieving the aforementioned disered outcomes, an oily ink for writing instruments in accordance with the present invention comprises.

a. a colorants,
b. a resins,
c. an organic solvents and
d. a gelling agents, wherein the said gelling agent comprises a soluble gelling agent with a solubility of from about 0.1 to about 20% by weight at the temperature of 20° C. to the said organic solvent, and the viscosity of the ink is not less than 700 mPa·s when the rate of shear is 0.1(1/s) and not greater than 500 mPa·s when the rate of shear is 100(1/s).

By the foregoing, an oily ink can be obtained that is capable of preventing the sedimentation of the colorants, including titanium dioxide, aluminum powder pigments and the like, while maintaining a good leveling and writing performance. Also, an oily ink can be obtained that dose not always require one to redisperse and restir.

Soluble gelling agents as used in accordance with the present invention are defined as ones providing pseudo-plasticity fluidity (thixotropic property) to the ink while forming a three dimensional mesh structure having the function of surface active agents capable of partially dissolving organic solvents (carbohydrate solvents). Examples include gelling agents with the solubility at the temperature of 20° C. to organic solvents, particularly to carbohydrate solvents, is from about 0.1 to about 20% by weight, preferably from 0.1 to 14% by weight.

By the foregoing, leveling property and writing performance can be displayed by the pseudo-plasticity fluidity (thixotropic property), while preventing the sedimentation of the said pigment particles by taking the colorants, especially pigment particles including the titanium dioxide, and the like in the foregoing dimensional mesh structure.

In accordance with the present invention, an oily ink for writing instruments, particularly a correction ink is provided that prevent the sedimentation of colorants, particularly opacifying pigment particles including titanium dioxide by catching the colorants, especially pigment particles including the titanium dioxide, and the like, while maintaining the leveling property and writing performance, thereby making redispersing and restirring not always necessary.

Also, in accordance with the present invention an oily ink for writing instruments is provided that is capable of drying quickly when writing on a non-absorbent surface as well as a penetrating surface, including paper, and the like, and having excellence in fluidity even when coating thickly on the surface.

Gelling agents to provide pseudo-plasticity fluidity include dispersible gelling agents like bentonite, and the like, but gelling agents useful in the present invention are, as previously mentioned, ones forming a three dimensional mesh structure (gel structure) in the ink having the surface activity to be partially dissolved into the organic solvents, catching the colorants into this three dimensional mesh structure (gel structure), while lowering the viscosity by the shear force in writing process.

The aforementioned gelling agents having the desired surface activity include certain types of metal soaps, but gelling agents used in the present invention are soluble ones having a solubility of from about 0.1 to about 20% by weight (preferably from 0.1 to 20% by weight) in the organic solvents at the temperature of 20° C. That is, the gelling agents must be the ones having the molecular structure of polar group and non-polar group whose solubility is from about 0.1 to about 20% by weight in the organic solvents at the temperature of 20° C., while providing the desired pseudo-plasticity fluidity property.

In such gelling agents, its three dimensional structure is estimated to have dispersal stability in the state of high viscosity catching the colorants, including pigment particles and the like, within the micellar structure. And when a shear force is applied to the ink when writing, fluidization occurs with lower viscosity, thereby showing the aforementioned leveling property and writing performance.

However, when the viscosity of the ink is less than 7800 mPa·s with a shear force of 0.1(1/s), the viscosity is so low that it becomes difficult to achieve the satisfactory prevention of the sedimentation of the colorants, maybe because of the instability in catching the colorants by the pigment particles even though three dimensional mesh structure is formed, thereby sometimes requiring redispersion by shaking or restirring.

On the other hand, when the viscosity of the ink is greater than 500 mPa·s with a shear force of 100(1/s), the fluidity lowers in writing, making it difficult to maintain the excellent leveling property and writing performance.

Therefore, it is desirable for this invention to have viscosity of not less than about 700 mPa·s with a shear force of 0.1(1/s), and not greater than about 500 mPa·s with a shear force of 100(1/s). However, considering the above, the preferred range of the viscosity relating to this invention is not less than about 700 mPa·s with a shear force of 0.1(1/s), and not greater than 500 mPa·s with a shear force of 100(1/s), and more preferably not less than 900 mPa·s with the shear force of 0.1(1/s) and not greater than 250 mPa·s with the shear force of 100(1/s).

The viscosity shown in the present invention is based on the viscosity (Pa.s) when a shear force is exerted on the ink by the rotation of the ball by using a correction pen having a pen-tip maintaining the ball whose tip is 1.00 mm with a gap of 60 μm. For example, the viscosity shown in the present invention is one measured by the Z20DIN rotor at a temperature of 20° C. using the reometer RS-75 manufactured by HAAKE Inc.

The viscosity of this ink is desirably achieved by soluble gelling agents by other viscosity modifiers can be used.

Such soluble gelling agents having these attributes can be used in this invention. Examples include sorbitol derivatives including dibenzylidene sorbitol and the like, dextrin fatty ester, hydrogenated castor oil, 1,2-hydroxystearic acid, gelling agents of polyether ester-type surfactant, and the like. As a soluble gelling agent, aluminum 2-ethylhexoate can most preferably be used. In the case of aluminum 2-ethylhexoate, it is estimated that (1) the molecules of aluminum 2-ethylhexoate form coordinate bonding due to the existence of aluminum metal and (2) the three dimensional mesh structure (gel structure) my micelle of the coordinate bond of aluminum 2-ethylhexoate is formed within the ink and (3) colorants are caught in this gel structure, thereby preventing the sedimentation of colorants.

Further, it is considered that the oily ink, in particular, the correction ink compounding this aluminum 2-ethylhexoate, is attributed to the three dimensional mesh structure (gel structure) by the said micelle, but has the thixotropic property of having high viscosity, which lower gradually with the rate of shear.

As aluminum 2-ethylhexoate, monosoap types and disoap types can be cited. The composition of the present invention is not limited to any one of the monosoap types, disoap types, and trisoap types, but to use aluminum 2-ethylhexoate of the disoap types alone or as a main component is preferable. The reason is considered as follows. In the disoap types, due to the molecular structure of the disoap types in the system of oily inks, it is easier to form a gel structure, and, compared to the monosoap types and trisoap types, the dispersal stability of the colorants (including titanium dioxide, coloring pigments and the like) is particularly excellent.

The content of the soluble gelling agents in the ink composition is not specifically limited. For example, it can be adjusted properly in accordance with the other compounds including the content or the types of solvents, and the like. For example, in the case of oily ink composition including correction liquid using cycloaliphatic carbohydrate-type colvents, like methylcyclohexane and the like, the content of the gelling agents like aluminum 2-ethylhexoate and the like, is preferably 0.05–5% by weight with respect to the total amount of the ink from a practical point of view. And the optimum range of 0.1–3% by weight with respect to the total amount of the ink.

When gelling agents including aluminum 2-ethylhexoate are contained in less than 0.05% by weight with respect to the total ink, the amount of compound is so little that the dispersal stability becomes poor and it is difficult to have thixotropic property since it is difficult for the oily ink system to form the mesh structure despite the excellence in brush coating and writing performance. On the other hand, when the gelling agents including aluminum 2-ethylhexoate is contained in greater than 5% by weight with respect to the total ink, the amount of compound is so much that the viscosity becomes too high and it is difficult to obtain good brush coating and writing performance despite the dispersal stability and thixotropic property of the colorants.

As for colorants, they are not specifically limited. Various types of white-colored or colored pigments can be used. The examples include inorganic pigments, organic pigments, resin particle pigments, fluorescent pigments, glittering pigments, light storing pigments, two-tone colored pigments, and the like. For example, as inorganic pigments or organic pigments, titanium dioxide, aluminum powder, brass powder, aliylene bismelamine, copper phthalocyanine pigments, threne pigments, azo pigments, quinacridon pigments, anthraquinone pigments, dioxane pigments, indigo pigments, thioindigo pigments, perynone pigments, perylene pigments, indolenone pigments, azomethine pigments, and the like can be cited. And as glittering pigments, glass flake pigments, metal coated pigments, and the like can be cited. As for other, as resin particle pigments, resin particle pigments colored by pigments or dyes can be used. Further, as colorants, dyes (including direct dyes, acid dyes, basic dyes, and the like) can also be used. These colorants can be used either alone or in combinations of two or more of them.

However, titanium dioxide with large specific gravity which is poor in dispersal stability and has the strong inclination to settle and separate at the bottom of the container in a settled state, can be used as the most suitable colorant in carrying out the present invention. As for titanium dioxide, any types can be used including rutile titanium dioxide, anatase titanium dioxide, and the like. However, in using a titanium dioxide for a correction liquid, rutile titanium dioxide with much opacifying property is particularly preferable.

The colorants in this invention, particularly titanium dioxide, preferably comprise from 20 to 60% by weight with respect to the ink composition. Particularly, in case of a correction ink, colorants as opacifying agents preferably comprise from 30 to 60% by weight with respect to the total amount of ink composition from a practical point of view and the optimal range is from 35 to 55% by weight with respect to the total amount of the ink composition. When colorants as opacifying agents are compounded in less than 30% by weight with respect to the total amount of the ink composition, it is difficult to obtain satisfactory opacifying power. When the colorants as opacifying agents are compounded in greater than 60% by weight with respect to the total amount of the ink composition, the viscosity becomes so high that it is difficult to obtain appropriate brush coating and writing performance. As for other colorants, an appropriate amount may be compounded in accordance with the desired use.

As for resins which can be used in accordance with the present invention, such resins may be used that show the desired solubility to the organic solvent, adhesion to the coated film forming surface or coated surface (written surface) or the dispersibility of the colorants. That is, well known resins such as film forming resins, binder resins, dispersing resins, and the like and in particular, the ones having compatibility with soluble gelling agents including aluminum 2-ethylhexoate, and the like. Examples include alkyl phenol resin, rosin-modified resin, alkyd resin, acryl resin, unsaturated thermoplastic elastomer, saturated thermoplastic elastomer, vinyl alkyl ether resin, cyclized rubber, petroleum resin, terpene resin, and the like. These can be selected appropriately in accordance with the character and the like of the coated film and can be used either alone or in combinations of two or more of them.

The amount of the resins to be compounded is not specifically limited and may be decided in accordance with the concentration of the colorants, but these resins preferably comprise in 3–30% by weight with respect to the total amount of the ink composition and the optimal range is 5–20% by weight with respect to the total amount of the ink composition. When these resins are compounded in less than 3% by weight with respect to the total amount of the ink composition, the fixability of the colorants to the coated surface lowers. When these resins are compounded in greater than 30% by weight with respect to the total amount of the ink composition, the viscosity becomes so high that it is difficult to obtain appropriate brush coating and writing performance.

As for organic solvents, ones which can achieve the solubility of the said resins and dryness of the coated films can be used. For example, hydrocarbon solvents including aliphatic hydrocarbon solvents, alicyclic hydrocarbon solvents, aromatic hydrocarbon solvents, halogenetad hydrocarbon solvents, and the like can be used. In addition, polar solvents including alcohol solvents such as methyl alcohol, ethyl alcohol, propyl alcohol, and the like; ketone solvents including methyl ethyl ketone, methyl isobutyl ketone, and the like and alcohol ether solvents including propylene glycol monomethyl ether, propylene glycol dimethyl, and the like can be used.

However, in an oily ink composition compounding aluminum 2-ethylhexoate, as organic solvents, hydrocarbon solvents including aliphatic hydrocarbon solvents, alicyclic hydrocarbon solvents, aromatic hydrocarbon solvents, halogenated hydrocarbon solvents, and the like can be preferably used. This is because in the case of hydrocarbon solvents, particularly of aliphatic hydrocarbon solvents, alicyclic hydrocarbon solvents, aromatic hydrocarbon solvents, halogenetad hydrocarbon solvents, the said three dimensional mesh structure (gel structure) can easily be formed thereby enabling the appearance of a prevention effect against the sedimentation and separation of the colorants fully contrary to the alcohol solvents including propyl alcohol and ketone solvents including methyl ethyl ketone in which the said three dimensional mesh structure (gel structure) by the micelle is hard to be formed in the ink. On the other hand, in soluble gelling agents including dibenzylidenesorbitan and the like, and said three dimensional mesh structure (gel structure) can easily be formed in alcohol solvents including propyl alcohol, and the like or alcohol ether solvents, thereby enabling the appearance of a satisfactory preventative effect against the sedimentation and separation of the colorants.

In the case of oily ink composition in this invention compounding soluble gelling agents including aluminum 2-ethylhexoate and the like, cyclohexane, methyl cyclohexane, ethyl cyclohexane, cyclopentane can preferably be used among alicyclic hydrocarbon solvents as an eraser liquid from the viewpoint of being difficult to dissolve the writing lines and of dryness, but what is more important is that such solvents should also provide the environment to easily form the three dimensional mesh structure (gel structure) in the system against the soluble gelling agents like aluminum 2-ethylhexoate.

For example, the same can be applied to aliphatic hydrocarbon solvents, particularly to iso-heptane, n-heptane, iso-octane, n-octane, and the like.

As for organic solvents, quickly drying organic solvents are preferably used. In particular, when such quickly drying organic solvents whose vapor pressure is at least 20 mm Hg, preferably 20–300 mmHg (20° C.-), —are used in the oily ink in this invention, particularly in the correction ink in this invention wherein the ink composition contains opacifying pigments including titanium dioxide and the like, since the pseudo-plasticity fluidity property is given to the ink, fluidity is shown when writing but after writing quickly dries losing the fluidity, it can be instantly written again on the opacifying surface. Therefore, they are preferable as a correction inks.

These organic solvents include, in addition to cyclohexane, methyl cyclohexane, ethyl cyclohexane, cyclopentane as previously mentioned, iso-hexane, iso-heptane, iso-octane, and n-octane can be cited. However, in view of quick dryness and pseudo-plasticity fluidity of the gelling agents, cyclohexane, methylcyclohexane, ethylcyclohexane, cyclopentane are preferable; particularly methylcyclohexane is preferable.

On the other hand, in dissolving soluble gelling agents like aluminum 2-ethylhexoate to, for example, alicyclic hydrocarbon solvents, by adding a little amount of alcohol (particularly methyl alcohol or ethyl alcohol), aluminum 2-ethylhexoate becomes easily dissolved.

That is, soluble gelling agents having polar group and non-polar group in the molecule becomes easy to dissolve by combining low polar (or non-polar) solvents and polar solvents. Also, by combining low polar (or non-polar) solvents and polar solvents, such soluble gelling agents, particularly for aluminum 2-ethylhexoate, easily form three dimensional mesh structure (gel structure) within its system.

To be concrete, the compounding ratio of the alcohol solvents including methyl alcohol, ethyl alcohol, isopropyl alcohol and the like to gelling agents is preferably 1 part by weight to 5 parts by weight. If alcohol solvents are compounded at greater than 5 parts by weight to 1 part by weight of gelling agents, even if alicyclic hydrocarbon solvents are compounded, a three dimensional mesh structure (gel structure) is not formed easily by the gelling agents including aluminum 2-ethylhexoate.

In the case of organic solvents, particularly of hydrocarbon solvents including aliphatic hydrocarbon solvents, alicyclic hydrocarbon solvents, aromatic hydrocarbon solvents, halogenetad hydrocarbon solvents, the content is preferably 10–70% by weight with respect to the total amount of weight with respect to the total amount of the ink.

When the content of these solvents is less than 10% by weight with respect to the total amount of the ink, the viscosity becomes so high that appropriate brush coating and writing performance is hard to obtain. On the other hand, when the content of these solvents is greater than 70% by weight with respect to the total amount of the ink, the opacifying property by colorants lowers and in the case of using colorants as opacifying agents, the practicality deteriorates.

For example, various types of dispersions and surface active agents in addition to fine silica flours to improve the coating and plastic pigments to adjust the flow property can be added.

Particularly, in the case of an oily ink in accordance with the present invention comprising a nonionic type surface-active agent, compared with an oily ink not containing said surface-active agent, dispersal stability of the colorants, particularly of the pigment particles, particularly of the pigment particles of a titanium dioxide and the fluidity of the ink can be further enhanced. This nonionic type surface-active agent is not specially limited, but higher alcohol ethylene oxide addition products, alkylphenol ethylene oxide addition products, and sorbitan aliphatic acid ester are preferable. As higher alcohol ethylene oxide addition products, polyoxyethylene lauryl ether, and polyoxyethylene stearly ether can be cited. As alkylphenol ethylene oxide addition products, polyoxyethylene nonyl phenyl ether and polyoxyethylene octyl phenyl ether can be cited. As sorbitan aliphatic acid ester, sorbitan monolaurate, sorbitan monooleate, sorbitan trioleate can be cited. In addition, the nonionic type surface-active agent preferably comprise from 0.3 to 5% by weight with respect to the total amount of the ink.

As above-mentioned, since the gel-type oily ink in accordance with the present invention can show excellent leveling property and can prevent the sedimentation of the colorants, while maintaining the rush coating and writing performance, it can be used for various types of writing instruments whether they are press-type or non-press-type, including oil-type ball-point pens and paint markers, in particular, erasers including correction pens and brush coating type correction liquid and the like.

For example, the gel-type oily ink in accordance with the present invention can be used for the correction pen 1 shown in the FIG. 1. This correction pen 1 contains an oily ink 12 in an ink containment tube 11 related to the present invention showing pseudo-plasticity fluidity. This oily ink 12 can contain all types of inks as far as they are in accordance with the present invention, while the correction pen 1 in this embodiment can preferably used for a quickly drying correction ink comprising titanium dioxide as an opacifying white pigment and a quickly drying organic solvent as an organic solvent. As shown in the FIG. 1, on an ink outflow part 14 at one end of the ink containment tube 11 of this correction pen 1, a rod type pen tip 13 comprising of fibers or plastics is attached. In addition, at the other end of the ink containment tube 11 having a bottom, a pressurizing device 15 pressurizing the said ink containment tube 11 is attached. Further, over this correction pen 1, a coverage structural body 16 is fitted to prevent the evaporation of quickly drying solvent contained in the oily ink 12 and to prevent dryness of the pen tip 13. For example, the ink containment tube 11 of this correction pen 1 is composed of a transparent or semi-transparent synthetic resin material. And in this embodiment, unlike a conventional correction pens or a brush coating type correction bottle, no stirrer is contained in the ink containment tube 11.

Figure 2:
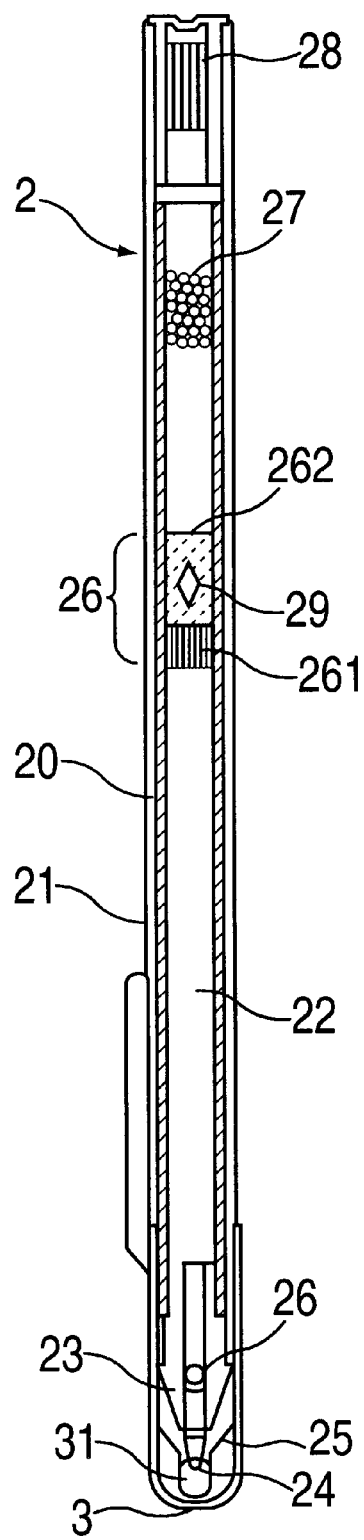
FIG. 2 is a schematic sectional view showing another embodiment of a correction pen in accordance with the present invention.

Further, for example, a gel-type oily ink in accordance with the present invention can be used for a correction pen 2 shown in the FIG. 2. In this correction pen 2, an ink containment tube 21 is charged in an outer cylinder 20 and an oily ink 22 related to this invention showing the pseudo-plasticity fluidity in the ink is contained in the ink containment tube 21. This oily ink 22 can also contain all types of inks as far as they are oily inks in accordance with the present invention, while the correction pen 2 in this embodiment can also preferably be used for a quickly drying correction ink comprising titanium dioxide as an opacifying white pigment and a quickly drying organic solvent as an organic solvent. As shown in FIG. 2, on an ink outflow part 23 at one end of the ink containment tube 21 of this correction pen 2, a pen tip 24 composed of a ball is attached to a socket 25. Also in the ink containment tube 21 of this correction pen 2, an ink follower 26 is contained in such a way that it attaches to the said oily ink 22 for preventing the back flow of the ink and the evaporation of the organic solvent. This ink follower 26 is composed of at least a first layer 261 touching the said oily ink 22 and a second layer 262 touching the first layer 261. And the said first layer 261 is composed of an aqueous gel-type substance containing a water-soluble polymer as a gelling agent and the said second layer 262 is composed of an organic liquid with involatile or nonvolatile property. Since the oily ink 22 contained in this writing instrument is a quickly-drying gel-type oily ink having pseudo-plasticity fluidity whose viscosity of the oily ink 22 contained in this writing instrument is not less than 700 mPa·s when the rate of shear is 0.1 (1/s) and not greater than 250 mPa·s when the rate of shear is 100 (1/s), It is important for the ink follower 26 to show the pseudo-plasticity fluidity depending on the said viscosity change with the outflow of this ink contacting with the said oily ink when this oily ink 22 flows out of the pen tip with thinning shear in writing, and to show the pseudo-plasticity fluidity suppressing the evaporation of the quickly-drying organic solvent. In this regard, in this writing instrument, the said aqueous gel-type substance is used as the first layer 261 and, particularly, in order to achieve the said requirement, as a gelling agent of the aqueous gel-type substance, saccharides including xanthane gum, welan gum, rhamsan gum, succinoglycan, gelan gum, and the like, celluloses including carboxymethyl cellulose, hydroxyethyl cellulose, and the like, synthetic water-soluble polymers including polyvinyl alcohol, polyacrylic acid sodium and the like, are preferably used. In addition, in order to further ensure to the meeting of the said requirement, this writing instrument provides at least the second layer 262 contacting with the first layer 261. The said second layer 262 is composed of involatile or non-volatile organic liquid or gelatinized organic liquid. And as this organic liquid, polybutene and the like can be preferably used other than silicone oil. Further, in particular, in the case of this embodiment, since it uses oily ink containing quickly drying organic solvent, in order to ensure the prevention of dryness of the ink and the evaporation of the organic solvent, as shown in the FIG. 2, at the pen tip 24 of a ball, in the direction of the outflow of the ink, the energizing force of a spring is provided and at the inner bottom of the cap 3, an elastic body 31 is provided to which the ball of this pen tip 24 adheres repulsively by the energizing force of a spring. As the elastic body 31, hotmelts, silicone balls, rubber caps, and the like can be used. For example, 26 is an ink outflow part conducting the oily ink 22 in the ink containment tube 21 to the direction of the pen tip 24, and in this writing instrument, a back flow preventive valve is provided in the ink outflow part 26. Also, in this writing instrument, a back flow preventive body 27 is charged. Further, at the end of the outer cylinder 20 at the other end of the ink containment tube 21, a dryness-preventing agent 28 is packaged therein. As a dryness-preventing agent 28, for example, grease-type substance in which a quickly drying solvent is gelatinized is preferable. For example, a float 29 is set in the ink follower. For a further example, both the ink containment tube 21 and the outer cylinder 20 of this correction pen 2, similar to the said embodiment, are composed of a transparent or semi transparent synthetic resin material. And the embodiment also refers to the correction pen without the need of stirring and shaking without any stirrer in the ink containment tube 21, unlike conventional correction pens or brush coating-type correction bottle products.

Since any of such correction pens as mentioned above contains gel-type oily ink with excellent dispersal stability, unlike the conventional correction pens or brush coating-type correction bottle products, it can flow out ink and write without shaking or stirring by a stirrer. Also, when the writing process is stopped, since the outflowing ink loses fluidity and dries immediately, no problem occurs including the outflow, blurring of the ink or the thickening of the tip of the coated film, and the like even when it is coated thickly on paper, thereby showing particular excellence in leveling property and rewriting performance, such as over-writing performance. Also, since the oily ink in accordance with the present invention is pseudo-plasticity fluidity body that is excellent in dispersal stability and can prevent the separation and sedimentation of colorants, the oily ink can be contained in a transparent or semi-transparent ink containment tube or the outer cylinder, thereby realizing the good product value including the good-looking appearance and the like. Further, it has the advantage of being capable of providing visual observation of the residual amount of the ink from the outside of the writing instrument.

The oily ink in accordance with the present invention cannot be restrictively applied to the said correction pen. For example, the configuration or the structure of the pen tip can be applied to cylinder bodies (rollers) in addition to balls and rods (including chips). Further, it can be also applied to a writing instrument having a pen tip holding a several pen-tip structure selected from balls, rods, and cylinder bodies. Also, in accordance with the present invention, as a measure to prevent the dryness of the ink and the evaporation of the organic solvent, any adhesion measures may be included as far as they are ones to adhere to the structure of the ink outflow part including the pen-tip other than the method mentioned in the said embodiment. Further, in the case of the said embodiment, although the ink containment tube and the outer cylinder are composed of a transparent or semi-transparent synthetic resin material, various types of the materials including the transparent or semitransparent glass materials or nontransparent synthetic resin materials or glass materials can be used. In addition, the ink containment tube can have the bottom as in a said embodiment or without the bottom as in a refilling type.

The said embodiment refers to a correction pen, however, it can be applied to paint markers or oil-type ball-point pens. Further, it can be applied for the correction tools with a bottle type brush coatings. For information, in the case of the oily ink including the quickly drying organic solvents, the most preferable is to apply for the correction pens, paint markers, and the oil-type ball-point pens whose structure can contain the oily ink in the closed space.

EXAMPLES (Example 1 and Comparative Examples)

The oily ink compositions of the present invention in the Examples (Table 1) and the other oily ink compositions in the Comparative examples (Table 2) were prepared according to the compounding compositions shown in the Tables. First, resins were heated and dissolved into methylcyclohexane, the organic solvent. Thereafter alcohol as a solution aiding agent, was added. Next, soluble gelling agents (where indicated) were added and made into solution by thoroughly stirring with the dissolver, thereby preparing resin liquid containing soluble gelling agents.

Next, titanium dioxide or aluminum powder pigment as the colorant, and the said resin liquid were mixed and after complete kneading, dispersion disposal was made using a heretofore known dispersing machine, thereby obtaining the specific oily ink. For information, the compounds shown in the Tables are represented by parts by weight.

TABLE 1

|  | Example | | | | | | | | (parts by weight) |
| --- | --- | --- | --- | --- | --- | --- | --- | --- | --- |
|  | 1 | 2 | 3 | 4 | 5 | 6 | 7 | 8 | 9 |
| Titanium dioxide | | | | | | | | | |
| A | 50 |  | 25 |  | 50 |  |  | 50 | 50 |
| B |  | 25 |  |  |  |  |  |  |  |
| C |  |  |  |  |  | 50 | 50 |  |  |
| Aluminum powder pigment |  |  |  | 4 |  |  |  |  |  |
| Gelling agent | | | | | | | | | |
| 2-aluminum ethylhexoate | 2 | 2 | 2 | 2 | 1.2 | 1.5 | 1.5 | 1.2 | 1.5 |
| Aluminum stearate | | | | | | | | | |
| Bentonite | | | | | | | | | |

TABLE 1-continued

| | Example | | | | | | | | |
|---|---|---|---|---|---|---|---|---|---|
| (parts by weight) | 1 | 2 | 3 | 4 | 5 | 6 | 7 | 8 | 9 |
| Alkyl phenol resin | 18 | 7 | | 20 | 2.5 | 8 | 6 | 2 | |
| Rosin-modified phenol resin | | | 4 | | | | | 0.5 | |
| Alkyd resin | | | | | | | | | 10 |
| Nonion type surface-active agent | | | | | | | | | |
| A | | | | | 1 | | | 1 | 2.5 |
| B | | | | | | 1 | 1 | | |
| Solvent | | | | | | | | | |
| Methylcyclohexane | 30 | 65 | 70 | 70 | 43.5 | 42.5 | 39.5 | 43.5 | 34 |
| Ethylalcohol | 2 | 2 | 2 | 3 | 1.8 | 2 | 2 | 1.8 | 2 |
| Solubility of gelling agent to the solvent (% bw) | 14 | 10.1 | 9.8 | 12.1 | 11.9 | 12.5 | 12.9 | 11.9 | 13.6 |
| Viscosity (mPa · s) | | | | | | | | | |
| Rate of shear 0.1 (l/s) | 7500 | 4900 | 6300 | 1500 | 900 | 1400 | 2500 | 1100 | 5700 |
| Rate of shear 100 (l/s) | 450 | 290 | 350 | 80 | 80 | 120 | 140 | 100 | 240 |
| Fluidity of the ink | | | | | | | | | |
| Ball diameter 1.5 mm | I | I | I | I | I | I | I | I | I |
| Ball diameter 1.0 mm | II | II | II | II | I | I | I | I | I |
| Ball diameter 0.5 mm | II | II | II | II | II | I | I | I | I |
| Leveling property | I | I | I | I | I | I | I | I | I |
| Writing performance | I | I | I | I | I | I | I | I | I |
| Dryness of the coated film | I | I | I | I | I | I | I | I | I |
| Dispersal stability | | | | | | | | | |
| Preserved at room temperature | | | | | | | | | |
| 1 week | I/I | I/I | I/I | I/I | I | I | I | I | I |
| 2 weeks | I/I | I/I | I/I | I/I | I | I | I | I | I |
| 1 month | I/I | I/I | I/I | I/I | I | I | I | I | I |
| 2 months | I/I | I/I | I/I | I/I | I | I | I | I | I |
| Preserved at 40° C. | | | | | | | | | |
| 1 week | I/I | I/I | I/I | I/I | I | I | I | I | I |
| 2 weeks | I/I | I/I | I/I | I/I | I | I | I | I | I |
| 1 month | I/I | II/II | I/I | II/II | I | I | I | I | I |
| 2 months | II/II | II/II | II/II | II/II | I | I | I | I | I |

TABLE 2

| | Comparative Example | | | | | | |
|---|---|---|---|---|---|---|---|
| (parts by weight) | 1 | 2 | 3 | 4 | 5 | 6 | 7 |
| Titanium dioxide | | | | | | | |
| A | 50 | 25 | | 50 | 50 | 50 | |
| B | | | | | | | |
| C | | | | | | | 50 |
| Aluminum powder pigment | | | 4 | | | | |
| Gelling agent | | | | | | | |
| 2-aluminum ethylhexoate | | | | | | 1 | 1.5 |
| Aluminum stearate | | | 2 | | | | |
| Bentonite | | | | | 2 | | |
| Alkyl phenol resin | 18 | | 20 | 18 | 18 | 2 | 6 |
| Rosin-modified phenol resin | | 4 | | | | | |
| Alkyd resin | | | | | | | |
| Nonion type surface-active agent | | | | | | | |
| A | | | | | | 1 | |
| B | | | | | | | 2.5 |
| Solvent | | | | | | | |
| Methylcyclohexane | 30 | 70 | 72 | 30 | 30 | 44.6 | 38 |
| Ethylalcohol | 2 | 2 | 3 | 2 | 2 | 1.4 | 2 |
| Solubility of gelling agent to the solvent (% bw) | 14 | 9.8 | 11.9 | 10.6 | 0 | 10.2 | 18.2 |
| viscosity (mPa · s) | | | | | | | |
| Rate of shear 0.1 (l/s) | 60 | 30 | 25 | 20 | 3600 | 360 | 210 |
| Rate of shear 100 (l/s) | — | — | — | — | 210 | 70 | 70 |
| Fluidity of the ink | | | | | | | |
| Ball diameter 1.5 mm | I | I | I | I | II | I | I |
| Ball diameter 1.0 mm | I | I | I | I | II | I | I |
| Ball diameter 0.5 mm | I | I | I | I | II | I | I |
| Leveling property | I | I | I | I | I | I | I |
| Writing performance | I | I | I | I | I | I | I |
| Dryness of the coated film | I | I | I | I | I | I | I |
| Dispersal stability | | | | | | | |
| Preserved at | | | | | | | |

TABLE 2-continued

|  | Comparative Example (parts by weight) | | | | | | |
|---|---|---|---|---|---|---|---|
|  | 1 | 2 | 3 | 4 | 5 | 6 | 7 |
| room temperature | | | | | | | |
| 1 week | III/III | II/I | III/III | III/III | III/III | I | I |
| 2 weeks | III/III | III/III | III/III | III/III | III/III | I | II |
| 1 month | III/III | III/II | III/III | III/III | III/III | II | III |
| 2 months | III/III | III/III | III/III | III/III | III/III | II | III |
| Preserved at 40° C. | | | | | | | |
| 1 week | III/III | II/II | III/III | III/III | III/III | I | I |
| 2 weeks | III/III | III/II | III/III | III/III | III/III | II | II |
| 1 month | III/III | III/II | III/III | III/III | III/III | III | III |
| 2 months | III/III | III/III | III/III | III/III | III/III | III | III |

In the Tables,

Titanium dioxide A is manufactured by Titan Kogyo Co., Ltd. under the trade name of Kronos KR-270, Titanium dioxide B is manufactured by Titan Kogyo Co., Ltd. under the trade name of Kronos KR-380N, Titanium dioxide C is manufactured by Ishihara Sangyo K. K. under the trade name of R-930, Aluminum powder pigment is manufactured by ECKART-WERKE under the trade name of HYDRO-LAC BGH CHROM X, Aluminum 2-ethylhexoate is manufactured by HOPE CHEMICAL CO., LTD., under the trade name of OCTOPE Al-A, Alkylphenol resin is manufactured by Arakawa Chemical Industries Ltd., under the trade name of TAMANOL 510

Rosin-modified resin is manufactured by Arakawa Chemical Industries Ltd., under the trade name of TAMANOL 135

Alkyd resin is manufactured by Arakawa Chemical Industries Ltd., under the trade name of Arakyd 6701-60

Nonionic surface active agent A is manufactured by Kao Corporation under the trade name of RHEODOLSP-010

Nonionic surface active agent B is manufactured by Kao Corporation under the trade name of EMULGEN 105

For information, in the Tables, the solubility of the soluble gelling agents to the organic solvent (20° C.) is represented by the solubility (% by weight) of each soluble gelling agent to methylcyclohexane and ethyl alcohol. The large value of solubility shows that the soluble gelling agents can easily be dissolved and as shown in the Comparative Example 5, if the solubility equals to 0, it shows that the soluble gelling agents are not dissolved to the solvent but disperse. In addition, in the Table, the viscosity is shown based on the viscosity (mPa·s) with the shear force added to the ink by the rotation of a ball using the correction pen shown in the said FIG. 2 having the pen-tip with a ball whose diameter at the top end is 1.0 mm holding the gap of 60 $\mu$m.

Next, the oily ink in the Examples 1–4 and the Comparative Examples 1–5 were put into glass bottles and the (dispersal stability) was evaluated at room temperature and at the temperature of 40° C. over time. Each of the evaluation items is as follows and in the Tables, the evaluation is represented by (the concentration of the top layer/the sedimentation amount at the sublayer).

(The concentration of the top layer)

The component of the top layer (supernatant liquid) of the oily ink in the glass bottle was stripped with a dropping pipette, coated on the black paper and evaluated. I is for the one which is the same as the initial state of the evaluation, II is for the one which is thinner compared with the said initial state of the evaluation, and III is for the one which is the state where nothing appears on the paper.

(The sedimentation amount at the sublayer)

The evaluation was relatively made by the amount of the cake raked by a spatula of the sublayer of the oily ink in the glass bottle. I is for the one which has little cake, II is for the one which has some cake, and III is for the one which has much cake.

Also, the oily ink in the Examples 5–9 and the Comparative Examples 6–7 were evaluated on stability at a settled state (dispersal stability) over time, and the whole appearance of the ink was observed from the top layer to the sublayer. In the Tables, I is for the one which is the same as the initial state of the evaluation, II is for the one in which sedimentation is seen compared with the said initial sate of the evaluation, and III is for the one in which sedimentation is clearly seen.

Next, in the Tables, organoleptic evaluation was made respectively on the fluidity of the ink (the amount of the outflowing ink).

The oily ink in the each Example and Comparative example was contained in the ink containment tube of the correction pen shown in the said FIG. 2 having a pen tip holding the ball whose diameter at the pen tip is 0.5 mm, 1.0 mm, and 1.5 mm with the gap of 30 $\mu$m, 60 $\mu$m, and 90 $\mu$m respectively and then written on black paper and evaluated.

I is for the one which is excellent, II is for the one which is good, and III is for the one which is not good.

Further, in the Table, organoleptic evaluation was made respectively on the leveling property, writing performance, and the dryness of the coated films. The oily ink in the each Example and Comparative Example was contained in the ink containment tube of the correction pen shown in the said FIG. 2 having a pen tip holding the ball whose diameter at the pen tip is 1.0 mm and written on the blank paper and evaluated.

I is for the one which is excellent, II is for the one which is good, and III is for the one which is not good.

For information, all correction pens used for the said various evaluations have the structure shown in the FIG. 2 and all of them use the ball-point pen tips made of stainless (the material of the ball: carbide alloy).

From the Tables, the ink in accordance with the present invention in the Examples was good in any respect of the fluidity, dispersal stability, leveling property, writing performance, and dryness of the ink. Particularly, in the case of the oily ink in the Examples 5–9 further compounding with nonionic surface-active agent, compared with the ink not compounding with nonionic surface-active agent, the fluidity and the dispersal stability of the ink was recognized to be enhanced a great deal by the effect of the said surface-active agent even when the resin compounding amount is little.

This invention can, as previously mentioned, prevent the sedimentation of the colorants, while maintaining a good leveling property, brush coating and writing performance in the case of an oily ink, particularly of the correction ink. Therefore, this invention can provide a correction pen which can be applied without redispersing or restirring. In addition, particularly, in the case of an oily ink having pseudo-plasticity fluidity containing opacifying pigments including titanium dioxide and quickly-drying organic solvent, extremely excellent correction ink can be obtained in that smooth rewriting surface appears even when written thickly because, when the writing process on the paper and the like stops, it dries instantly, while losing the fluidity.

Therefore, the oily ink composition of the present invention can preferably be used for a correction ink but further can be applied for an ink for oily ball-point pens and an ink for paint markers as well.

What is claimed is:

1. An oily ink for writing instruments comprising
   a. colorants,
   b. resins,
   c. an organic solvent and
   d. a gelling agent,
   wherein the said gelling agent comprises a soluble gelling agent with the solubility of from about 0.1 to about 20% by weight at a temperature of 20° C. to the said organic solvent, and the viscosity of the ink is not less than 700 mPa·s when the rate of shear is 0.1 (1/s) and not greater than 500 mPa·s when the rate of shear is 100 (1/s).

2. An oily ink for writing instruments as set forth in claim 1, wherein the viscosity of the ink is not less than 900 mPa·s when the rate of shear is 0.1 (1/s) and not greater than 250 mPa·s when the rate of shear is 100 (1/s).

3. An oily ink for writing instruments as set forth in claim 1, wherein said colorant comprises titanium dioxide.

4. An oily ink for writing instruments as set forth in claim 3, wherein titanium dioxide is present in an amount from about 20 to about 60% by weight with respect to the total amount of the ink.

5. An oily ink for writing instruments as set forth in claim 1, wherein said gelling agent is present in an amount from about 0.05 to about 5% by weight with respect to the total amount of the ink.

6. An oily ink for writing instruments as set forth in claim 1, wherein said organic solvent comprises a hydrocarbon solvent.

7. An oily ink for writing instruments as set forth in claim 1, wherein said organic solvent comprises a quick-drying organic solvent having a vapor pressure of at least 20 mmHg (20° C.).

8. An oily ink for writing instruments as set forth in claim 6, wherein said organic solvent comprises methylcyclohexane.

9. An oily ink for writing instruments as set forth in claim 1, wherein said organic solvent is present in an amount from about 10 to about 70% by weight with respect to the total amount of the ink.

10. An oily ink for writing instruments as set forth in claim 1, wherein said resin comprises an alkylphenol resin, a rosin-modified resin, or an alkyd resin.

11. An oily ink for writing instruments as set forth in claim 1, wherein said resin is present in an amount from about 3 to about 30% by weight with respect to the total amount of the ink.

12. An oily ink for writing instruments as set forth in claim 1, further comprising a nonionic surface-active agent.

13. An oily ink for writing instruments as set forth in claim 12, wherein said nonionic surface-active agent comprises a higher alcohol ethylene oxide addition product, an alkylphenol ethylene oxide addition product, or a sorbitan aliphatic acid ester addition product.

14. An oily ink for writing instruments as set forth in claim 12, wherein said nonionic surface active agent is present in an amount from 0.3 to about 5% by weight with respect to the total amount of the ink.

15. A writing instrument containing an oily ink as set forth in claim 1.

16. A writing instrument as set forth in claim 15, wherein the oily ink set forth in claim 1 is contained in an ink containment tube of said writing instrument, and at one end of the said ink containment tube is attached a pen tip, and an ink follower is so contained in the said ink containment tube as to come in contact with the said oily ink, and the said ink follower is composed of at least a first layer that comes in contact with the oily ink and a second layer that comes in contact with said first layer, and said first layer is aqueous gel-type substance and said second layer is an organic liquid with an involatile or a nonvolatile property.

17. A writing instrument as set forth in claim 16, wherein said aqueous gel-type material comprises a water-soluble polymer as a gelling agent.

18. A writing instrument as set forth in claim 17, wherein said water soluble polymer comprises a polysaccharide.

19. A writing instrument as set forth in claim 15, wherein the writing instrument comprises at least any one of a ball, a roller and a rod at an ink outflow part at a pen tip.

20. A writing instrument as set forth in claim 19, wherein said ink can by visually observed from outside said writing instrument.

21. A method using of a correction pen as set forth in claim 19 comprising opacifying a mispelling by writing on the mispelling without shaking or stirring said correction pen.

22. An oily ink for writing instruments comprising
   a. colorants,
   b. resins,
   c. an organic solvent and
   d. a gelling agent,
   wherein the said gelling agent comprises a soluble gelling agent with the solubility of from about 0.1% to about 20% by weight at a temperature of 20° C. to the said organic solvent, and the viscosity of the ink is not less than 700 mPa°s when the rate of shear is 0.1 (1/s) and not greater than 500 mPa°s when the rate of shear is 100 (1/s),
   wherein said gelling agent comprises aluminum 2-ethylhexoate.

23. An oily ink for writing instruments, comprising
   a. colorants,
   b. resins,
   c. an organic solvent and
   d. a gelling agent,
   wherein the said gelling agent comprises a soluble gelling agent with the solubility of from about 0.1% to about 20% by weight at a temperature of 20° C. to the said organic solvent, and the viscosity of the ink is not less than 700 mPa°s when the rate of shear is 0.1 (1/s) and not greater than 500 mPa°s when the rate of shear is 100 (1/s),
   wherein said gelling agent comprises aluminum 2-ethylhexoate.

* * * * *